United States Patent
Malmstrom

(10) Patent No.: US 7,770,131 B2
(45) Date of Patent: Aug. 3, 2010

(54) SUBSYSTEM, SHARED-CONTROL APPARATUS AND METHOD

(76) Inventor: R. Dean Malmstrom, 9627 N. Old Orchard La., Cedar Hills, UT (US) 84062

( * ) Notice: Subject to any disclaimer, the term of this patent is extended or adjusted under 35 U.S.C. 154(b) by 209 days.

(21) Appl. No.: 12/057,259

(22) Filed: Mar. 27, 2008

(65) Prior Publication Data

US 2008/0174604 A1    Jul. 24, 2008

Related U.S. Application Data

(63) Continuation of application No. 11/044,526, filed on Jan. 27, 2005, now Pat. No. 7,353,458.

(60) Provisional application No. 60/543,092, filed on Feb. 9, 2004.

(51) Int. Cl.
*G06F 3/048* (2006.01)
*G06F 3/00* (2006.01)

(52) U.S. Cl. .................. 715/788; 715/765; 715/700

(58) Field of Classification Search ............... 715/788, 715/765, 700
See application file for complete search history.

(56) References Cited

U.S. PATENT DOCUMENTS

| | | | |
|---|---|---|---|
| 4,290,084 A | | 9/1981 | Minshull et al. |
| 5,260,697 A | | 11/1993 | Barrett et al. |
| 5,412,400 A | | 5/1995 | Takahara et al. |
| 5,745,161 A | * | 4/1998 | Ito .......................... 348/14.09 |
| 5,838,317 A | | 11/1998 | Bolnick |
| 5,909,548 A | | 6/1999 | Klein et al. |
| 5,974,135 A | | 10/1999 | Breneman |
| 6,313,880 B1 | | 11/2001 | Smyers et al. |
| 6,567,869 B2 | | 5/2003 | Shirley |
| 6,580,451 B2 | | 6/2003 | Yonezawa et al. |
| 2002/0033848 A1 | | 3/2002 | Sciammarella et al. |
| 2002/0141658 A1 | | 10/2002 | Novak et al. |
| 2003/0020671 A1 | | 1/2003 | Santoro et al. |
| 2003/0097640 A1 | | 5/2003 | Abrams |
| 2003/0112248 A1 | | 6/2003 | Pronkine |
| 2003/0149884 A1 | | 8/2003 | Hernandez et al. |
| 2003/0223733 A1 | | 12/2003 | Chang |
| 2004/0001106 A1 | | 1/2004 | Deutscher |
| 2004/0001479 A1 | | 1/2004 | Pounds |
| 2004/0015980 A1 | | 1/2004 | Rowen et al. |
| 2004/0017513 A1 | | 1/2004 | Takahashi et al. |
| 2004/0150581 A1 | | 8/2004 | Westerinen et al. |
| 2004/0225968 A1 | * | 11/2004 | Look et al. .................. 715/778 |
| 2005/0022135 A1 | | 1/2005 | de Waal |

(Continued)

OTHER PUBLICATIONS

Microsoft Contact Center Framework-White Paper, Dec. 2003, 17 pages.*

(Continued)

*Primary Examiner*—Ting Lee
(74) *Attorney, Agent, or Firm*—Pate Pierce & Baird

(57) ABSTRACT

A method for integrating and sharing the monitoring and control of multiple subsystems. The method may include identifying an integration system comprising a first display processor and a first command processor. The first display processor may receive a display signal from each subsystem of the subsystems being monitored and controlled. The method may also include storing personalized display layouts, receiving commands from multiple workstations, and routing the commands received to the appropriate subsystems.

20 Claims, 13 Drawing Sheets

U.S. PATENT DOCUMENTS

2005/0278655 A1* 12/2005 Sims .......................... 715/792
2007/0250868 A1 10/2007 Konno

OTHER PUBLICATIONS

National Institute of Advanced Industrial Science and Technology, *An Innovative Display System to Present Multiple Images of Different Formalities*, Sep. 15, 2004, http://www.aist.go.jp/aist_e/latest_research/2004/20041019/20041019.html.

Facet Corp, *Using the Terminal Emulator to Run Your Application*, Dec. 14, 2004, http://www.facetcorp.com/facetwindt_help/facetwindtUsing_the_Terminal_Emulator_to_R.htm.

Ruether, David, Premiere Basics for Intuitive Operation Using Timeline Editing, http://web.wrchive.org/web/20031005183450/http://www.ferrario.com/ruether/premiere.htm accessed Jul. 22, 2005.

KVM Switches: Solving the Branch Office Nightmare, Advertising Section, Information Week, Apr. 9, 2007, p. 50.

* cited by examiner

SUBSYSTEM, SHARED-CONTROL APPARATUS AND METHOD

RELATED APPLICATIONS

This application is a continuation of U.S. patent application Ser. No. 11/044,526 filed Jan. 27, 2005, which claims the benefit of U.S. Provisional Patent Application Ser. No. 60/543,092 filed on Feb. 9, 2004.

BACKGROUND

1. The Field of the Invention

This invention relates to control systems and, more particularly, to novel systems and methods for integrated monitoring and control of multiple subsystems.

2. The Background Art

The proliferation of computers, control systems, and other electronic devices has created an increasingly difficult problem for the human operators and users that must monitor and control them. In many operations and control centers, a user must monitor and control three, four, or more separate systems in order to perform designated responsibilities. Operator work areas having multiple visual display terminals, keyboards, pointing devices, etc. are common.

In many situations, this problem is exacerbated when the various systems being monitored and controlled employ different operating systems and use different visual display devices. Often the most important systems in an operations center or control room are older systems that cannot easily be modified or integrated with newer systems. Accordingly, the information of greatest importance to a user is often distributed across a variety of display devices.

Currently, there are devices such as keyboard, video, and mouse switches (KVMs) that allow a user to switch between multiple computer systems, while using a single workstation. These devices have significant limitations. For example, they typically allow the user to view and control only one system at a time.

Display integrators have also been developed. Typically, display integrators combine multiple images, thereby allowing a user to monitor the output of multiple systems from a single display device. However, display integrators neither reduce the number of control input devices nor permit redirection of command inputs. They merely aggregate display images.

Currently, personal computers and televisions may monitor and control one or more systems by displaying images from the connected systems and redirecting control from a keyboard and pointer. These devices, however, also have significant limitations. For example, they are limited in their ability to work in real time with multiple diverse systems. Furthermore, they do not allow the user to customize the display image by sizing and positioning the various display elements at will. Moreover, they do not support the creation of arbitrarily selected subwindows or the saving and reuse of information layout.

What is needed is a system that gives a user the power to integrate the monitoring and control of various disparate systems (subsystems). Additionally, what is needed is a system that gives a user the power to customize the display image produced on the display of a workstation to meet individual needs, facilitate one's work, and accommodate one's own preferences.

BRIEF SUMMARY OF THE INVENTION

In view of the foregoing, in accordance with the invention as embodied and broadly described herein, a method and apparatus are disclosed in one embodiment of the present invention as including a system providing integrated monitoring and control of one or more subsystems. A system providing integrated control may be any arrangement where a user issues commands to, and receives monitoring display information from, multiple subsystems. In selected embodiments, such a system may include an integrator interfacing between a workstation and multiple subsystems.

In certain applications, a subsystem may output a display signal in a particular form (e.g. interface standard). Similarly, that subsystem may receive commands in a particular form. The display signals and commands of another subsystem may be incompatible with those of the first subsystem. In such applications, an integrator in accordance with the present invention may function as a translator between a workstation and the otherwise incompatible subsystems.

In selected embodiments, an integrator may translate the display signals, received from the subsystems in various, physically disparate forms, into a common form. Once in a common form, the display signals may be integrated into a composite display signal. The composite display signal may be passed from the integrator to the display of a workstation. Similarly, an integrator may translate the commands received from the various input devices of a workstation into commands that may be understood by the various subsystems to which the commands are directed.

In certain embodiments, an integrator may include a display processor and a command processor. The display processor may receive the various display signals from the connected subsystems, generate a composite display signal defining various windows, and transmit the composite display signal to the display of the workstation. In some embodiments, each incoming display signal may be assigned to at least one window defined by the composite display signal. In other embodiments, only selected incoming display signals or portions of incoming display signals may each be assigned a window.

The command processor may direct commands received from one or more input devices of the workstation to their appropriate destinations. Appropriate destinations may include the integrator itself, a neighboring integrator, one or more of the connected subsystems, or the like. If necessary, a command processor may translate commands before directing them to their destination.

In selected embodiments, a command processor may communicate selected commands, received from a workstation, to the display processor. For example, a command processor may pass a command to the display processor for implementing commands directed to opening, closing, sizing, positioning, or the like. Accordingly, a command processor may provide the mechanism through which a user selects, sizes, positions, or otherwise manipulates the windows presenting real-time visual feedback from multiple subsystems. In certain embodiments, a command processor may support the saving and recalling of various display layouts comprising arrangements of windows that the user has created and found to be useful.

In certain embodiments, a command processor may be configured to receive, store, and enforce access limitations corresponding to a user. An access limitation may be any restriction on what commands are forwarded by the command processor to the intended destination. For example, in selected situations, it may be desirable to limit which users are able to control selected critical functions of a subsystem. Accordingly, an access limitation may indicate that if a particular user issues a command affecting a critical function of a subsystem 12, that command is to be ignored and not forwarded.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE SELECTED EMBODIMENTS

Figure 1:
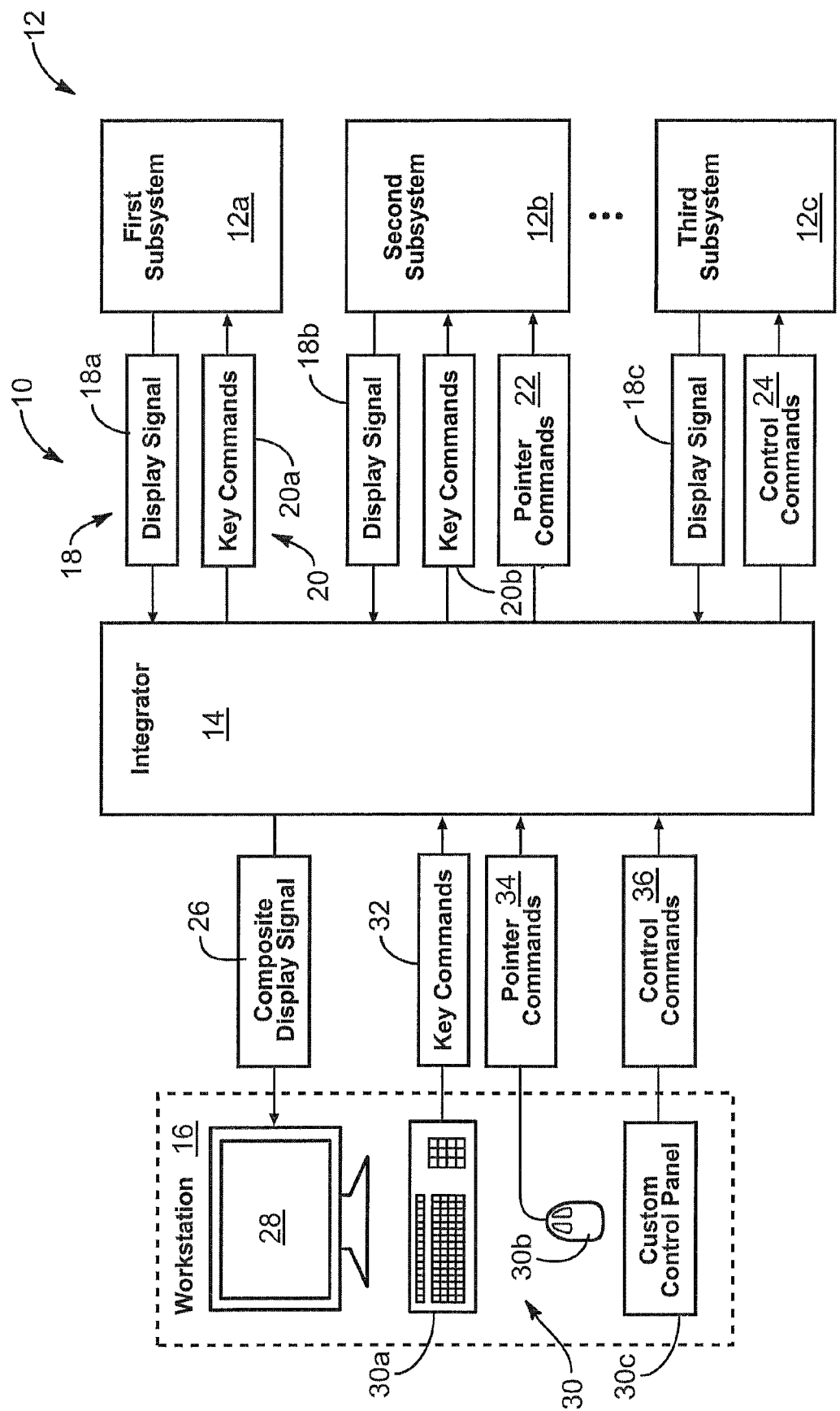
FIG. 1 is a schematic block diagram of a system in accordance with the present invention comprising an integrator interfacing between a workstation and multiple subsystems.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of the various embodiments of the invention. The invention will be best understood by reference to the drawings, wherein like parts are designated by like numerals throughout.

Referring to FIG. 1, selected embodiments in accordance with the present invention may include a system 10 providing integrated control over one or more subsystems 12. Control may be defined in terms of a control loop. A control loop may include two flows of information. Information flowing out may be referred to as a command. Information flowing in may be referred to as feedback. Feedback allows the user or system issuing a command to verify that the command was properly received, understood, and implemented by the system or subsystem being controlled. Accordingly, control may be defined as a process where in commands are issued and verification feedback is received.

A system 10 providing integrated control may be any arrangement where a user, workstation, or the like is empowered with hardware, software, or some combination thereof permitting the issuance of commands to, and the reception of feedback from, multiple subsystems 12 through a convenient and compact interface. In selected embodiments in accordance with the present invention, a system 10 providing integrated control (i.e. an Integrated Control System or ICS) may include an integrator 14 interfacing between a workstation 16 and multiple subsystems 12.

In certain applications, one or more subsystems 12 may be designed with a particular control system in mind. In such applications, a subsystem 12a may output feedback (e.g. display signal 18a) in a particular form that may be analogized to a particular language. Similarly, that subsystem 12a may receive commands (e.g. key commands 20a) in a particular form that may also be analogized to a particular language. Depending on the application, the display signals 18b and key commands 20b of a second subsystem 12b may be in different languages or otherwise incompatible with those of the first subsystem 12a. In such applications, the subsystems 12a, 12b may be considered physically disparate or may be said to communicate through display signals 18a, 18b and key commands 20a, 20b that are physically disparate in form.

Physically disparate subsystems 12 are often the result of advances in technology. For example, a first subsystem 12a may have been designed and built when displays of a particular kind where considered standard. Accordingly, the first subsystem 12a may have been designed to output display signals 18a in a form understood by such displays. However, as technology advanced, new display technology may have been developed. A second subsystem 12b, developed in more recent times, may be designed to output display signals 18b in a form understood by the new displays. Thus, the display signals 18a of the first subsystem 12a may be incompatible with the display signals 18b of the second subsystem 12b.

In the illustrated embodiment of FIG. 1, an integrator 14 in accordance with the present invention is connected to three representative subsystems 12a, 12b, 12c. In other embodiments, a greater or lesser number of subsystems 12 of various input and output forms or languages may be connected to an integrator 14. Accordingly, the following more detailed description of FIG. 1 is not intended to limit the scope of the invention, but is merely representative of selected subsystems 12 to which integrated control in accordance with the present invention may be applied.

A first subsystem 12a provides an example of an older computer system using DOS (i.e. an operating system used on IBM personal computers and compatible machines) to run applications. The first subsystem 12a may be designed to output a display signal 18a compatible with a monochrome display. However, rather than sending the display signal 18a to a monochrome display, the first subsystem 12a may send the display signal 18a to an integrator 14. Similarly, rather than receiving key commands 20a directly from a keyboard, the first subsystem 12a may receive key commands 20a from the integrator 14.

A second subsystem 12b provides an example of a more advanced computer system designed to interface with a keyboard, pointing device (e.g. a "mouse"), and a color, higher resolution display. Rather than sending the display signal 18b in RGB form to a color, higher-resolution display, the second subsystem 12b may send the display signal 18b to the integrator 14. Similarly, rather than receiving key commands 20b and pointer commands 22 directly from a keyboard or mouse, the second subsystem 12b may receive key commands 20b and pointer commands 22 from the integrator 14.

A third subsystem 12c provides an example of a customized subsystem. Such a subsystem 12c may include a first serial communication port for outputting a display signal 18c in the form of ASCII characters to a character terminal. Rather than sending the display signal 18c to a character terminal, the third subsystem 12c may send the display signal 18c to the integrator 14. The first serial port, or a second serial port or other type of interface, may be connected to the integrator 14 to facilitate communication of control commands 24.

In addition to the monochrome, RGB, and ASCII display signals 18 discussed hereinabove, other suitable display signals 18 that may be received and processed by an integrator in accordance with the present invention may include any variety of component, composite, or compressed signal, whether digital or analog (e.g. $YC_bC_r$, $YP_bP_r$, NTSC, PAL, S-Video, MPEG, JPEG, or the like). In selected embodiments, display signals 18 may encompass more than just images. For example, any voltage, current, contact condition, encoded digital signal, value corresponding to a state of a component, and the like may be used to control any type of display device or indicator device and may be considered a display signal.

In selected embodiments, an integrator 14 may function as a translator between a workstation 16 and the subsystems 12. An integrator 14 may translate the display signals 18, received from the subsystems 12 in various, physically disparate forms, into a common form. Once in a common form, the display signals 18 may be integrated into a composite display signal 26 that may be passed from the integrator 14 to a display 28 of a workstation 16. A workstation 16 in accordance with the present invention may include any combination of displays 28. If desired, one or more of the displays 28 utilized in a workstation 16 may be a high-resolution display.

A workstation 16 in accordance with the present invention may also include any combination of input devices 30. Suitable input devices 30 may include control panels, keyboards, pointers or cursor-control devices, or the like. In the illustrated embodiment, a workstation 16 includes three input devices 30 (i.e. a keyboard 30a, pointer 30b, and custom control panel 30c). The keyboard 30a may communicate key commands 32 to an integrator 14. The pointer 30b may communicate pointer commands 34 to an integrator 14. The custom control panel 30c may communicate serial, parallel, or other types of commands 36 to an integrator 14. An integrator 14 may translate the commands 32, 34, 36 received from the various input devices 30 into commands 20, 22, 24 that may be understood by the various subsystems 12 to which the commands 32, 34, 36 are directed.

Figure 2:
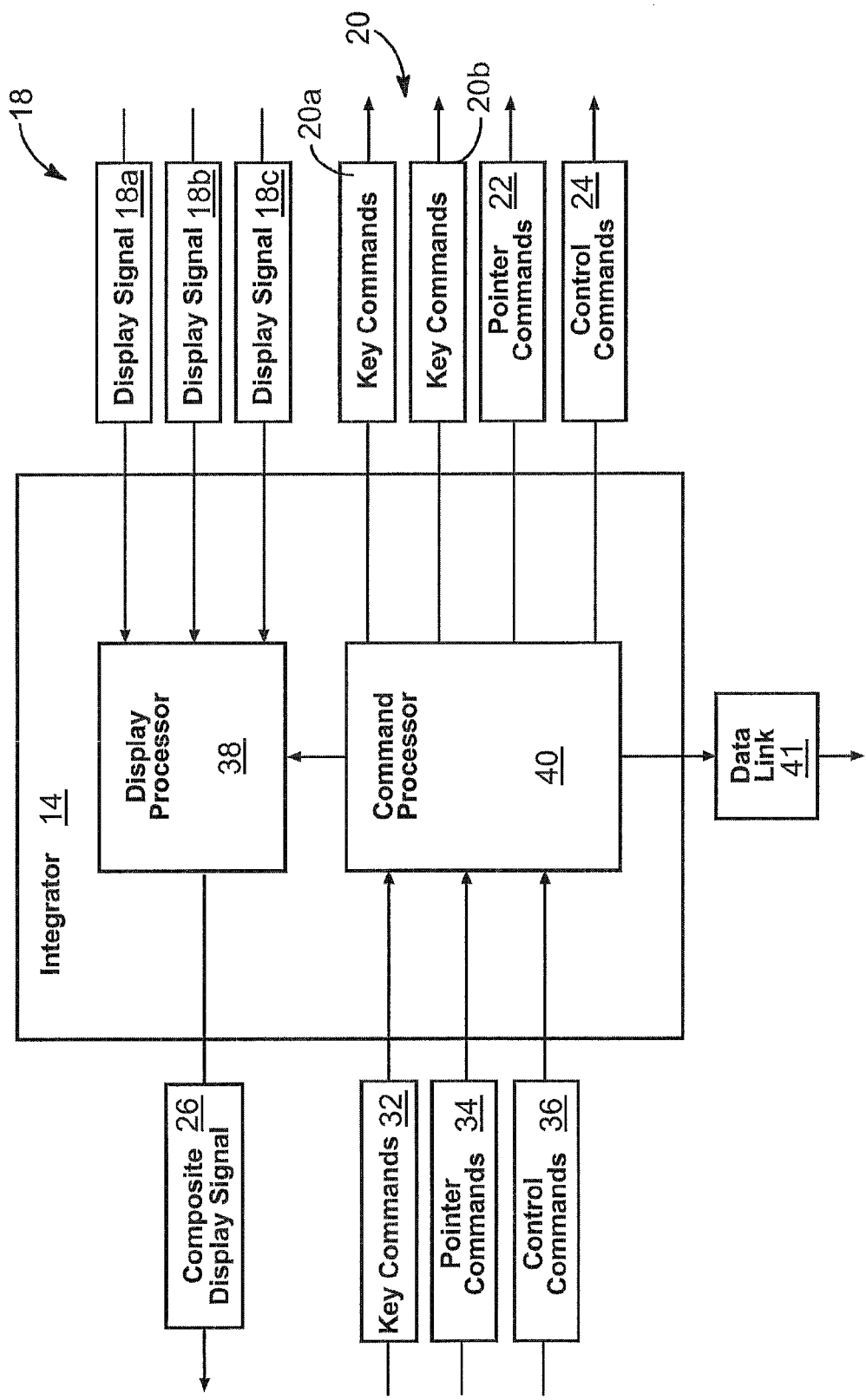
FIG. 2 is a schematic block diagram of an embodiment of an integrator in accordance with the present invention.

Referring to FIG. 2, an integrator 14 in accordance with the present invention may include a display processor 38 and a command processor 40. A display processor 38 may receive display signals 18 from the connected subsystems 12, translate (if necessary) the display signals 18 to a common or compatible form, and generate a composite display signal 26. A command processor 40 may receive commands 32, 34, 36 from a workstation, translate (if necessary) the commands 32, 34, 36 into commands 20, 22, 24 understood by the various subsystems 12 to which the commands 32, 34, 36 are directed, and forward the commands 20, 22, 24 to the appropriate subsystems 12.

In selected embodiments, a command processor 40 may communicate selected commands, received from a workstation 16, to the display processor 38. For example, a command processor 40 may pass commands directed to image opening, closing, sizing, positioning, or the like to the display processor 38 for implementation. Accordingly, an integrator 14 in accordance with the present invention may provide the mechanism through which a user may select, size, position, and otherwise manipulate real-time visual feedback from multiple subsystems 12.

If desired, an integrator 14 in accordance with the present invention may include a data link 41. In certain embodiments, a data link 41 may connect a command processor 40 of one integrator 14 to the command processor 40 of another integrator 14. Accordingly one integrator 14 may exert control over another integrator 14. Additionally, a data link 41 may allow an integrator 14 to be controlled by an external data processing system. In one embodiment, such a data link 41 may comprise an IEEE 802.3 network interface.

Figure 3:
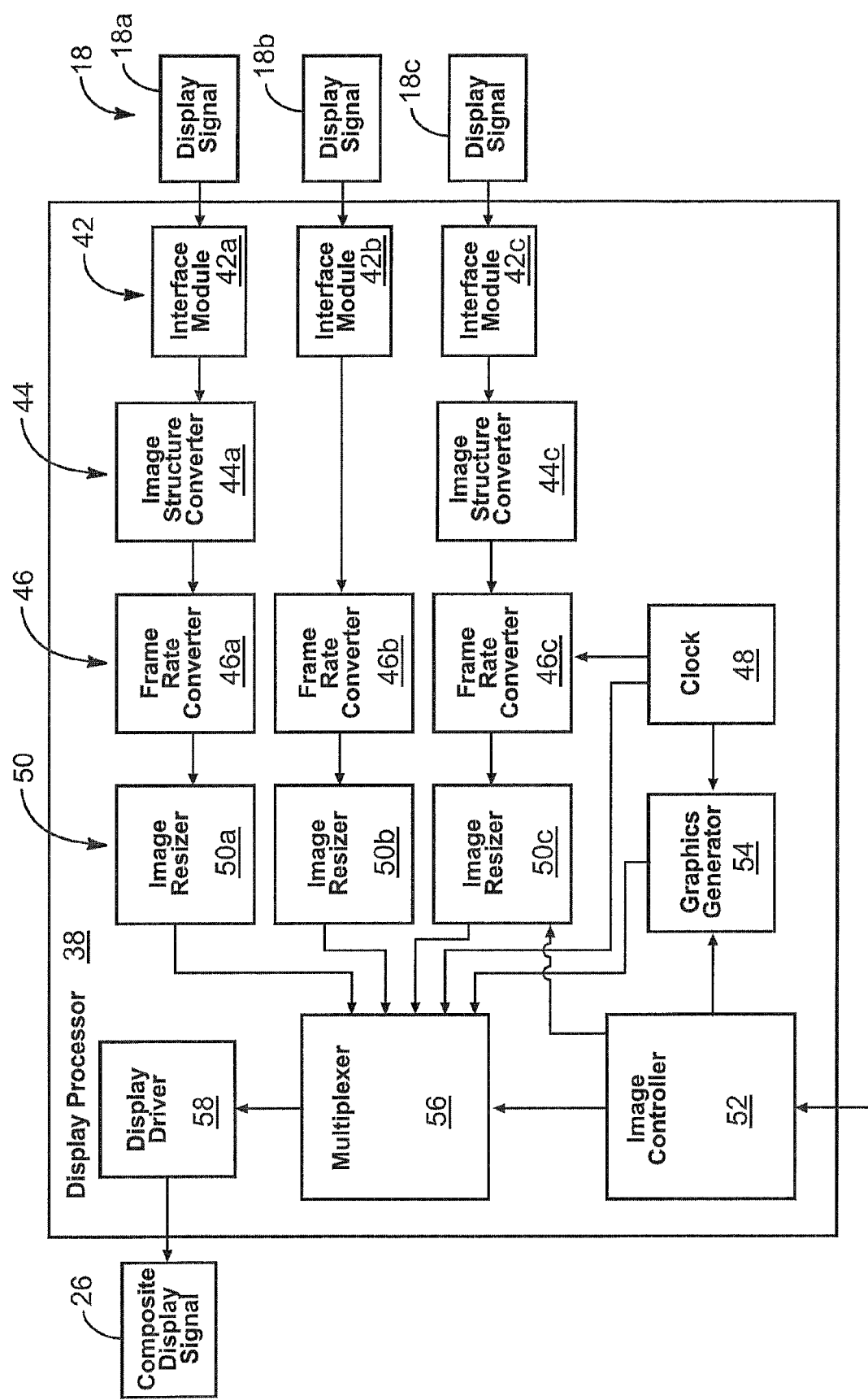
FIG. 3 is a schematic block diagram of an embodiment of a display processor from an integrator in accordance with the present invention.

Referring to FIG. 3, a display processor 38 in accordance with the present invention may include various interface modules 42. One interface module 42 may service each incoming display signal 18. In selected embodiments, an interface module 42 may function as an emulator, providing the mechanical and electrical requirements normally presented by the display to which the display signal 18 is sent. For example, an interface module 42 may provide the mechanical attachment, voltage, impedance, or the like that would normally be provided by the display device.

After passing through an interface module 42, a display signal 18 may enter an image structure converter 44. An image structure converter 44 may convert the display signal 18 to a common image structure. In embodiments where an incoming display signal 18 is already in the common image structure, it may be passed through without alteration. Any suitable structure may suffice for a common image structure. In one embodiment, an image structure converter may convert all incoming display signals 18 to an RGB structure of some predetermined resolution, for example.

In general, an image structure converter 44 may apply any process necessary to effectuate a conversion. For example, in certain embodiments, an image structure converter 44 may apply an eight-bit, linear-RGB, progressive scan. In embodiments where the display signal 18 is interlaced, monochrome analog, the image structure converter 44 may de-interlace the display signal 18 and convert the luminance information into the common image structure. In embodiments where the display signal 18 comprises serial ASCII characters, the image structure converter may create a virtual image of a character terminal based on the incoming display signal 18, then transform the virtual image into the common image structure.

Display signals 18 of common image structure may be passed to frame rate converters 46. A frame rate converter 46 may convert each incoming display signal 18 to a common frame rate. A common frame rate may be any suitable value. In one embodiment, a frame rate converter may convert all incoming display signals 18 to seventy progressive frames per second. If desired or necessary, a display processor 38 may include a clock 48 operably connected to support the operation of the frame rate converter 46.

Display signals 18 of common image structure and frame rate may be passed to image resizers 50. An image resizer 50 may manipulate incoming display signals 18 to permit multiple display signals 18 to be included within the composite display signal 26. For example, a display 28 of a workstation 16 may have a limited number of pixels. For illustrative purposes, it may be assumed that a display 28 is limited to 1600×1200 pixels. A user may desire a window of 640×480 pixels on the display 28 to present a display signal originally sized for a display of 800×600 pixels. In such a situation, an image resizer 50 may "down-convert" the display signal 18 by one and one quarter times its original, linear pixelation.

Again for illustrative purposes, one may assume that a user desires to create another window of 480×360 pixels on the display to present a display signal 18 originally sized for a display of 320×240 pixels. In such a situation, an image resizer 50 may "up-convert" the display signal 18 by one and one half. In certain embodiments, a display signal 18 may be up-converted or down-converted by a factor of up to eight.

In selected embodiments, an image resizer 50 may up-convert or down-convert display signals 18 according to commands received from an image controller 52. In certain embodiments, an image controller 52 may determine whether to resize a display signal 18 by comparing the size of the display signal 18 to the size of the window in which the display signal 18 is to be presented.

In certain embodiments, a display processor 38 in accordance with the present invention may include a graphics generator 54. A graphics generator 54 may add various graphic features to the composite display signal 26. For example, in selected embodiments a graphics generator 54 may add borders around windows, buttons, and other control icons as well as macros that facilitate control over the functions of an integrator 14 or any subsystem 12 connected to the integrator 14. In certain embodiments, a graphics generator 54 may be synchronized by a clock 48 with the processed display signals 18.

In selected embodiments, an image controller 52 may control the various operations and processes of a display processor 38. In some embodiments, an image controller 52 may receive commands from a command processor 40. Such commands may reflect how a user desires to modify the composite display signal 26 to produce a desired visual output on a display 28 of a workstation 16. For example, an image controller 52 may receive, from a command processor 40, commands with respect to the opening, closing, sizing, positioning, and layering of various windows defined by the composite display signal 16. An image controller 52 may also receive commands with respect to which image area of a particular display signal 18 is to be displayed within any particular window.

Under the control of an image controller 52, a multiplexer 56 may receive and combine the processed display signals 18 of the connected subsystems 12, graphic features generated by the graphics generator 54, and input, as needed, from a clock 48 to form a composite display signal 26. The composite display signal 26 may be forwarded by a display driver 58 to a display 28 of a workstation 16.

Figure 4:
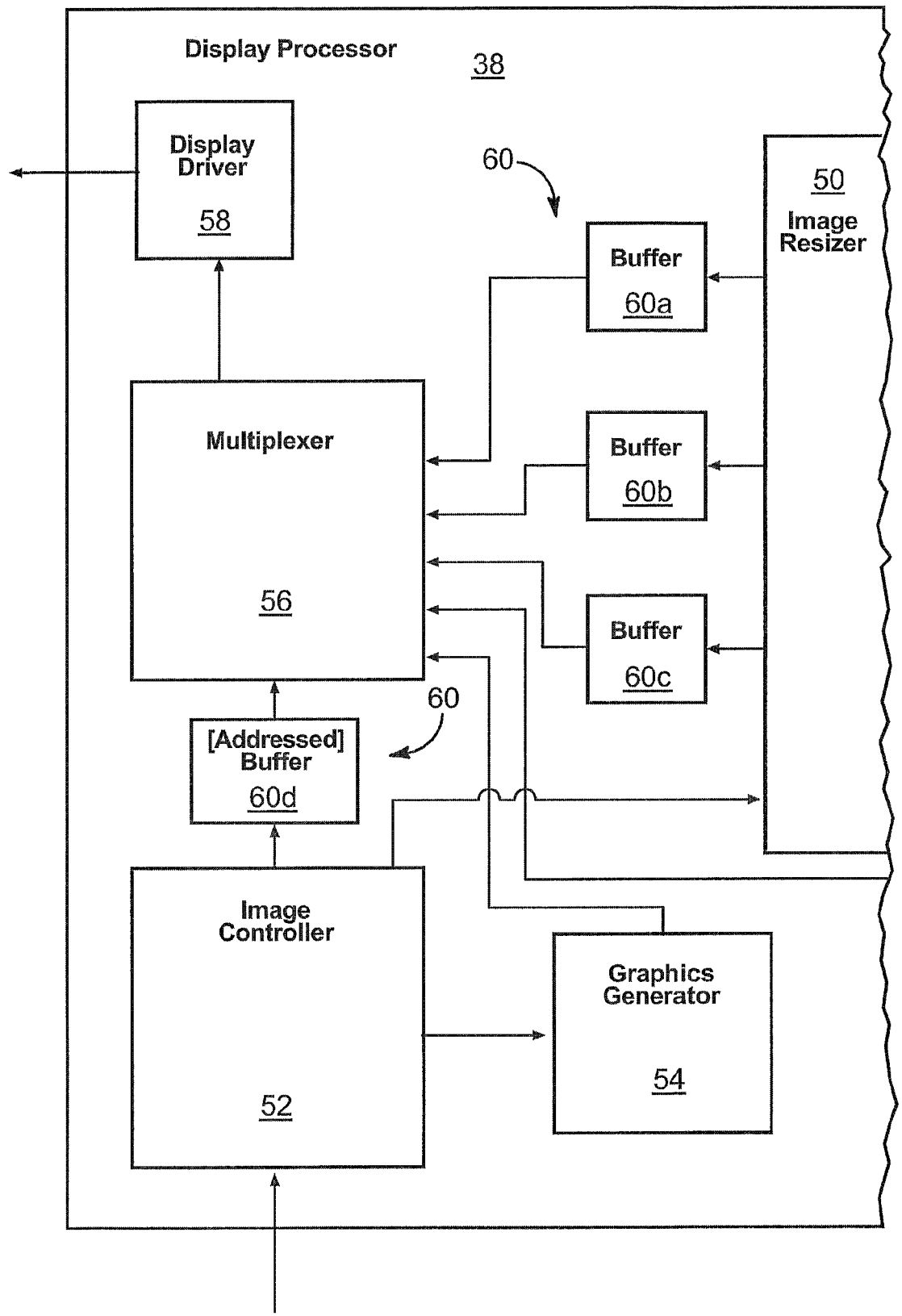
FIG. 4 is a partial schematic block diagram of an embodiment of a display processor equipped with an addressed buffer in accordance with the present invention.

Referring to FIG. 4, a display processor 38 in accordance with the present invention may include one or more buffers 60 as needed. For example, a buffer 60a, 60b, 60c may be assigned to each display signal 18a, 18b, 18c as it transitions from the image resizer 50 to the multiplexer 56. Physically, such buffers 60a, 60b, 60c may be independent components or subcomponents contained within either or both of the image resizer 50 and the multiplexer 56.

In selected embodiments, a buffer 60d may be positioned logically between the image controller 52 and multiplexer 56 while being positioned physically as an independent component or a subcomponent contained within either or both of the two.

In one embodiment, a buffer 60d between an image controller 52 and a multiplexer 56 may be an addressed buffer 60d. A conventional buffer may provide an array or matrix of the same size or dimension as the display to which the display signal will be sent. For example, a conventional buffer for an RGB display of 1600×1200 pixels may comprise a 1600×1200 matrix with each element containing an RGB value for the corresponding pixel. In contrast, an addressed buffer 60d in accordance with the present invention may comprise an array or matrix with each element containing either pixel color information (e.g. an RGB value) or an address providing one element of indirection wherein pixel color information may be found for the corresponding pixel.

For example, an address contained within an addressed buffer 60d may direct the multiplexer 56 to look for the actual pixel color information in some other buffer 60. In selected embodiments, to facilitate the determination of whether an element contains pixel color information or an address, various bits of data corresponding to each element may identify that element as corresponding to pixel color information or an address. An addressed buffer 60d in accordance with the present invention may simplify the hardware and software required by the display processor 38. For example, control code for the multiplexer 56 may be contained within the addressed buffer 60d.

Figure 5:
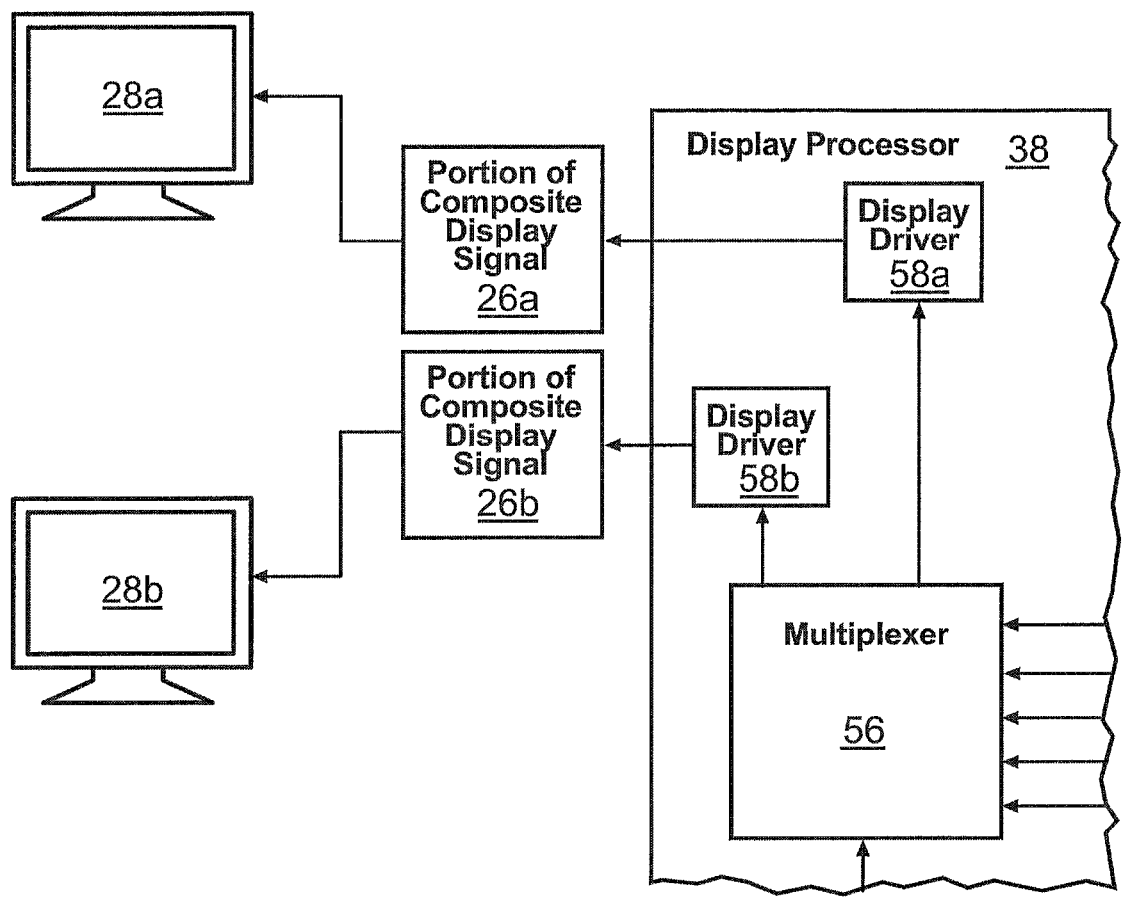
FIG. 5 is a partial schematic block diagram of an embodiment of a display processor in accordance with the present invention providing a composite display signal to multiple workstation displays.

Referring to FIG. 5, in selected embodiments, a workstation 16 in accordance with the present invention may include two or more displays 28. Multiple displays 28 may be desirable when numerous subsystems 12 are included within the system 10 or when some of the subsystems 12 provide display signals 18 of comparatively higher resolution.

In certain embodiments, multiple displays 28 may be treated as a single logical display. That is, a multiplexer 56 may partition the composite display image 26 into as many portions as there are displays 28. Each portion of the composite display signal 26 may then be forwarded to a corresponding display 28. For example, in one embodiment, a multiplexer 56 may partition the composite display signal 26 into first and second portions. The first portion may be forwarded by a first display driver 58a to a first display 28a of a workstation 16. The second portion may be forwarded by a second display driver 58b to a second display 28b of the workstation 16.

Figure 6:
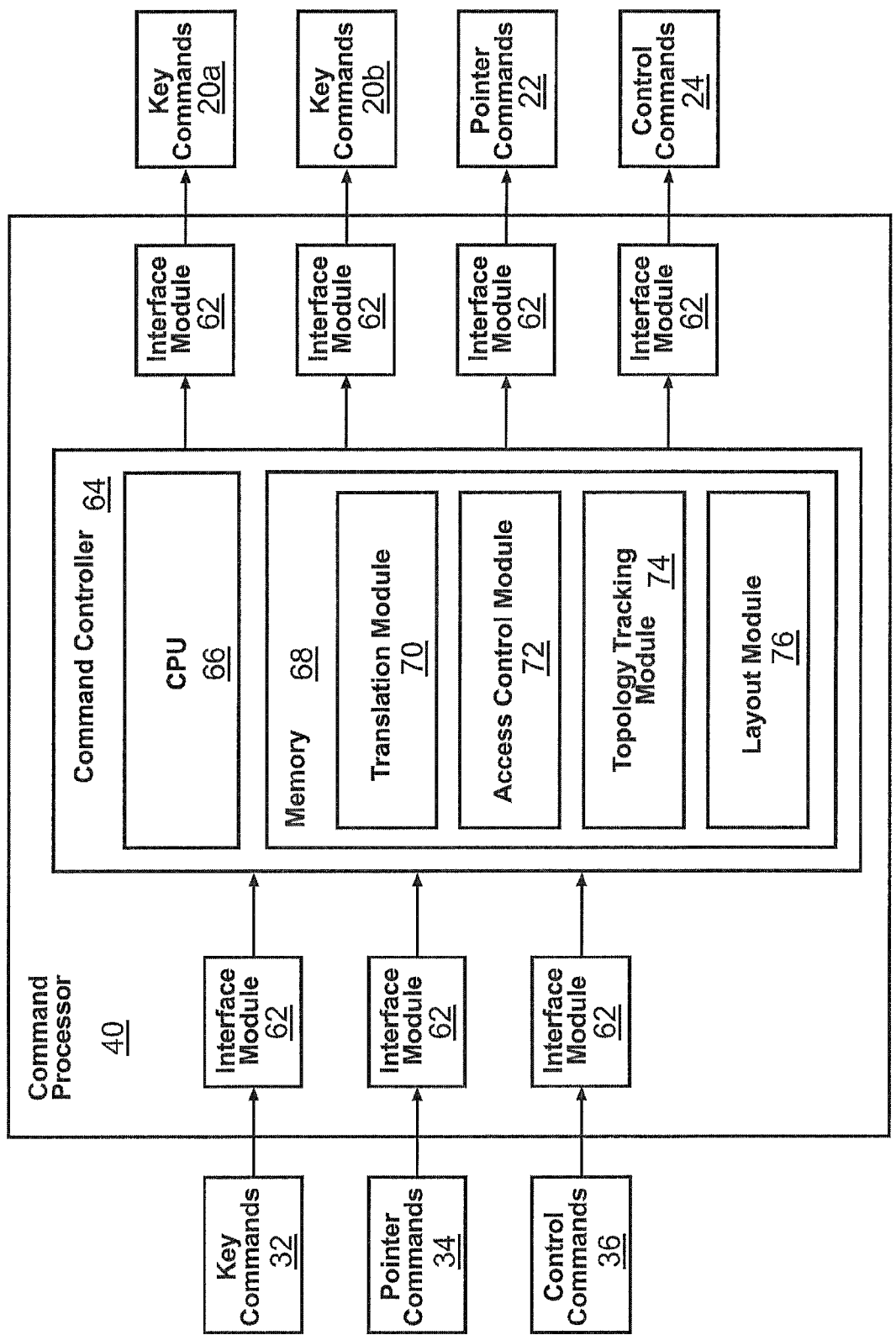
FIG. 6 is a schematic block diagram of an embodiment of a command processor from an integrator in accordance with the present invention.

Referring to FIG. 6, in general, a command processor 40 in accordance with the present invention may process commands 32, 34, 36 of two varieties or types. A first type may include commands 32, 34, 36 intended by a user for one or more subsystems 12. A command 32, 34, 36 to adjust the heat generated in a particular temperature zone control by a first subsystem 12a may be an example of a command 32, 34, 36 of the first type. A second type may include commands 32, 34, 36 intended by a user for the integrator 14 itself. A command 32, 34, 36 to open, close, size, position, or activate a window presented on the display 28 of a workstation 16 may be an example of a command 32, 34, 36 of the second type.

Commands 32, 34, 36 of either type may be entered in any suitable manner. For example, commands 32, 34, 36 may be entered by clicking with a pointer 30*b*, dragging with a pointer 30*b*, clicking and dragging with a pointer 30*b*, typing on a keyboard 30*a*, or manipulating special function keys, knobs, switches, etc. on a keyboard 30*a* or control panel 30*c* or virtual buttons, knobs, dials, etc. on a screen image console.

In certain embodiments, a command processor 40 may include various interface modules 62. One interface module 62 may service each incoming command 32, 34, 36 and outgoing command 20, 22, 24. Similar to the interface modules 42 of a display processor 38, in selected embodiments, the interface modules 62 of a command processor 40 may function as emulators, providing the mechanical and electrical requirements normally presented by the corresponding systems or input devices. That is, for example, interface modules 62 for incoming commands 32, 34, 36 may provide the mechanical attachment, voltage, impedance, or the like that a system would normally provide to the input devices 30. Similarly, interface modules 62 for outgoing commands 20, 22, 24 may provide the mechanical attachment, voltage, impedance, or the like that a system would normally receive from an input device.

In selected embodiments, a command processor 40 may include a command controller 64. A command controller 64 may receive incoming commands 32, 34, 36 from selected interface modules 62 and issue commands 20, 22, 24 to others 62. In certain embodiments, a command controller 64 may include a CPU 66 operably connected to a memory device 68. The memory device 68 may include data structures in the form of executables and operational data. The data structures may comprise various modules. For example, in one embodiment, the data structures form a translation module 70, access control module 72, topology tracking module 74, and layout module 76.

A translation module 70 in accordance with the present invention may be configured to receive incoming commands 32, 34, 36 and determine the destination thereof. If the commands 32, 34, 36 are directed to a destination (e.g. subsystem 12, image controller 52, etc.) receiving inputs in a different form or language than that of the commands 32, 34, 36, the commands 32, 34, 36 may be translated by the translation module 70 into commands 20, 22, 24 of proper form. In selected embodiments, translation of commands 34 from a pointer 30*b* may include appropriate scaling of cursor movements. Commands 20, 22, 24 of proper form may be forwarded by the translation module 70 to the destination.

An access control module 72 in accordance with the present invention may be configured to receive, store, and enforce access limitations corresponding to any user. For example, in selected embodiments, each user of a system 10 in accordance with the present invention may be required to log in with a username and password. An access module 72 may receive the username and apply a corresponding set of access limitations. An access limitation may be any restriction on what commands 32, 34, 36 are forwarded by the integrator 14 to the intended destination (e.g. subsystem 12, image controller 52, etc.).

For example, in selected situations, it may be desirable to limit which users are able to restart a subsystem 12. Accordingly, an access limitation may indicate that if a particular user directs a restart command (e.g. Control-Alt-Delete) to a subsystem 12, that command is to be ignored and not forwarded. In other situations, an access limitation may prevent a particular user from opening or closing a particular window presenting the display signal 18 of a particular subsystem 12. In certain embodiments, an access control module 72 may receive access limitations for the various users from an administrator whose username is associated with substantially no access limitations.

In selected embodiments, an access control module 72 may control access on a user-by-user, or command-by-command basis. For example, each username may be coupled or associated with a list of prohibited (or, if more convenient, permitted) commands. Alternatively, an access control module 72 may control access according to a series of access levels. In such embodiments, each access level may be associated with selected access privileges. The access granted a user may be controlled by selecting the access level assigned to the user. For example, users assigned an access level of five may have fewer access limitations than users assigned an access level of three.

A topology tracking module 74 in accordance with the present invention may be configured to maintain a current record of all subsystems 12 connected to an integrator 14. In selected embodiments, a topology tracking module 74 may also maintain a current record of the various input forms or languages used by the various subsystems 12. Accordingly, a topology tracking module 74 may work in cooperation with a translation module 70 to identify how (i.e. into what forms or languages) the various commands 32, 34, 36 are to be translated.

In certain embodiments, a topology tracking module 74 may be configured to maintain a current record of all subsystems 12 associated with any neighboring integrator 14 connected via a data link 41. Such a topology tracking module 74 may also maintain a current record of the various input forms or languages used by the subsystems 12 so connected. Accordingly, a topology tracking module 74 may facilitate translation and forwarding of commands 32, 34, 36 and display signals 18 from one integrator 14 to another 14.

A layout module 76 in accordance with the present invention may be configured to support the creation, storage, and recall of various display layouts. A display layout may be any arrangement of windows, virtual control panels, or the like defined or generated by the composite display signal 26 on the display 28 of a workstation 16. In selected embodiments, a user may issue commands 32, 34, 36 until a desired display layout is achieved. When commanded, the desired display layout may be saved by the layout module 76. Later, when a user desires to view a saved display layout, he may issue commands 32, 34, 36 causing the layout module 76 to retrieve or recall that particular display layout.

Figure 7:
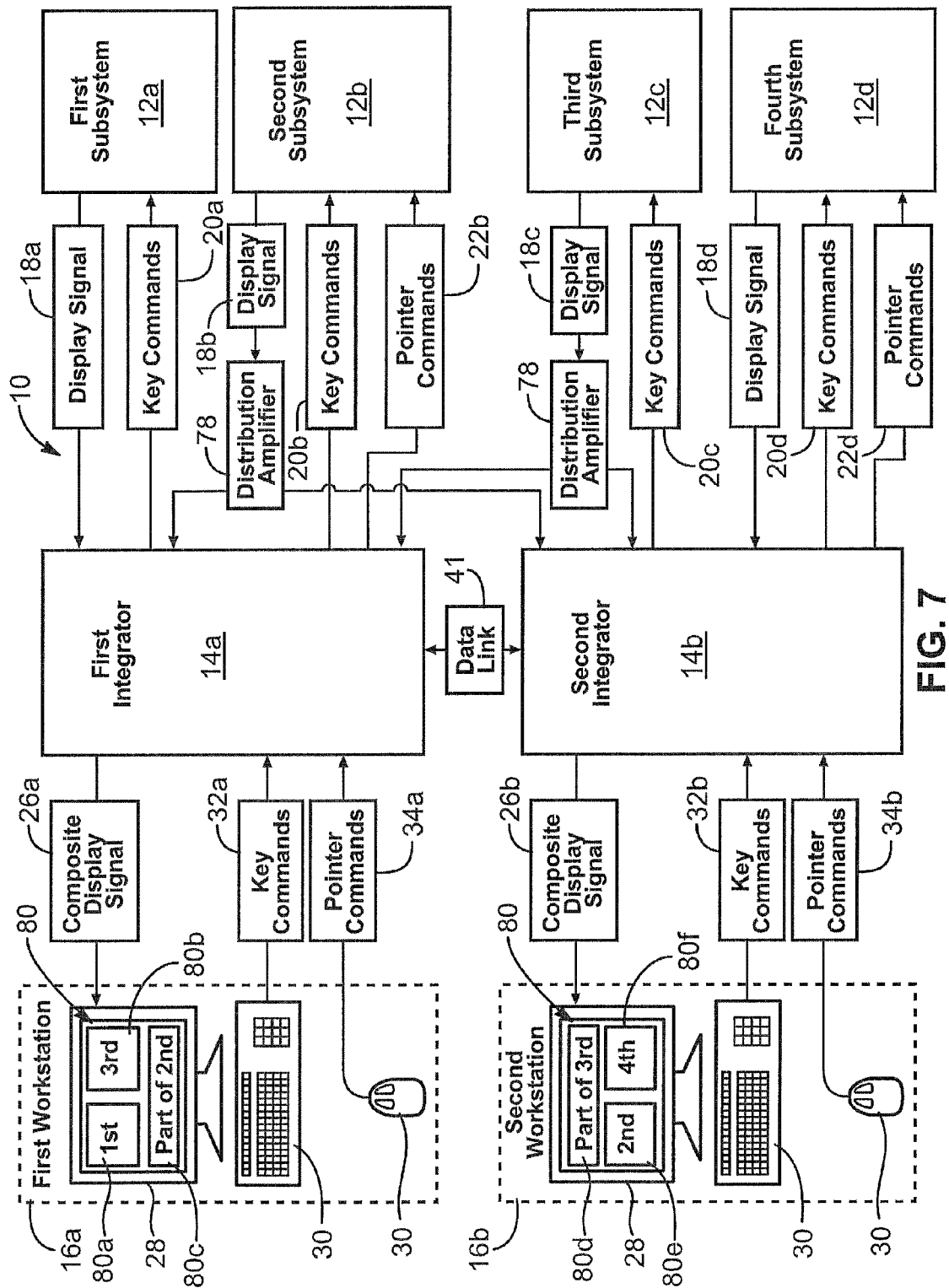
FIG. 7 is a schematic block diagram of a system in accordance with the present invention comprising a first integrator interfacing between a first workstation and first multiple subsystems, a second integrator interfacing between a second workstation and second multiple subsystems, and a data link connecting the first integrator to the second integrator.

Referring to FIG. 7, in selected embodiments, two or more integrators 14 in accordance with the present invention may be interconnected. In the illustrated embodiment, a first integrator 14*a* is connected to a second integrator 14*b* via data link 41. The first integrator 14*a* provides the interface between a first workstation 16*a* and first and second subsystems 12*a*, 12*b*. The second integrator 14*b* provides the interface between a second workstation 16*b* and third and fourth subsystems 12*c*, 12*d*. In other embodiments, a greater or lesser number of subsystems 12 of various input and output forms or languages may be connected to a greater or lesser number of integrators 14. Accordingly, the following more detailed description of FIG. 7 is not intended to limit the scope of the invention, but is merely representative of how multiple integrators 14 in accordance with the present invention may be interconnected.

In certain embodiments, a display signal 18 from one subsystem 12 may be directed to more than one integrator 14. For example, the display signal 18*b* of the second subsystem 12*b* and the display signal 18*c* of the third subsystem 12*c* may be directed to both integrators 14*a*, 14*b*. If desired or necessary, one or more devices or modules (e.g. distribution amplifiers 78) may assist in the division, regeneration, or amplification the signals 18*b*, 18*c*.

By receiving display signals 18*a*, 18*b*, 18*c* from the first, second, and third subsystems 12*a*, 12*b*, 12*c*, a first integrator 14*a* may generate a composite display signal 26*a* dedicating a window 80 to each display signal 18*a*, 18*b*, 18*c* or a portion thereof. For example, a first window 80*a* may display the entire content corresponding to a display signal 18*a* of the first subsystem 12*a*, a second window 80*b* may display the entire content of a display signal 18*c* of the third subsystem 12*c*, and a third window 80*c* may display a portion of the display content corresponding to a signal 18*b* of the second subsystem 12*b*. Similarly, by receiving display signals 18*b*, 18*c*, 18*d* from the second, third, and forth subsystems 12*b*, 12*c*, 12*d*, a second integrator 14*b* may generate a composite display signal 26*b* dedicating a window 80*d*, 80*e*, 80*f* to each corresponding display signal 18*b*, 18*c*, 18*d* or a portion thereof.

In such an arrangement, a user of each workstation 16*a*, 6*b* may have shared control of two subsystems 12 and exclusive control of one subsystem 12. However, each user may have exclusive (absent any access limitation to the contrary) control over that user's own display layout. That is, each user, independent of the other, may configure the positioning, sizing, or the like of the various windows 80 in a manner that best suits that individual. Accordingly, a user of the second workstation 16*a* may prefer a window 80*e* presenting the entire content of a display signal 18*b* of the second subsystem 12*b*, while the user of the first workstation 16*a* may prefer a window 80*c* presenting only a selected portion of the content of a display signal 18*b* of the second subsystem 12*b*.

In selected embodiments, each user may control any connected subsystem 12 having one or more windows 80 on his or her display 28. Any suitable method may be used to arbitrate control between users. In certain embodiments, only one user may actively control (as opposed to simply monitor) a subsystem 12 at any given time. For example, if desired, the last user to select and activate a window 80 may have control of the corresponding subsystem 12.

If desired, other methods may be used to arbitrate control between users. For example, in some embodiments, a fixed arrangement may be used. In a fixed arrangement, each user may be mapped to specific subsystems 12. Accordingly, only that user may control those specific subsystems 12.

In other embodiments, a dynamic arrangement may be used. For example, in a "round robin" arrangement, any operator may take control of a subsystem 12. Accordingly, activation of control by one user may automatically release control from all other users. Such an arrangement may require verbal communication between users. However, it may facilitate rapid changes of control.

In still other embodiments, a priority arrangement may be used. In such an arrangement, higher priority users may take control from lower priority users. Lower priority users may take control of a subsystem 12 only if a higher priority user has not activated (taken the focus of control for) that subsystem 12. This may require higher priority users to explicitly release control of subsystems 12 when finished.

In certain situations, a user may desire to send one or more commands 32, 34, 36 to a subsystem 12 that is not directly connected to the integrator 14 employed by the user. For example, referring to the illustrated embodiment, the user of the first workstation 16*a* may desire to send a command 32, 34, 36 to the third subsystem 12*c*. While the third subsystem 12*c* may provide a display signal 18*c* directly to the first integrator 14*a*, it may not receive commands 20, 22, 24 directly from the first integrator 14*a*.

In such situations, the first integrator 14*a* may recognize that the third subsystem 12*c* receives commands 20, 22, 24 directly from the second integrator 14*b*. Accordingly, the first integrator 14*a* may pass any commands 32, 34, 36 that it receives for the third subsystem 12*c* to the second integrator 14*b* for delivery. In some embodiments, raw, unprocessed, or untranslated commands 32, 34, 36 may be sent from the first integrator 14*a* to the second integrator 14*b*. In other embodiments, a first integrator 14*a* may generate and send processed or translated commands 20, 22, 24 to the second integrator 14*b*. In selected embodiments, the transfer of commands 32, 34, 36 (translated or otherwise) between integrators 14*a*, 14*b* may be carried out by a data link 41.

Figure 8:
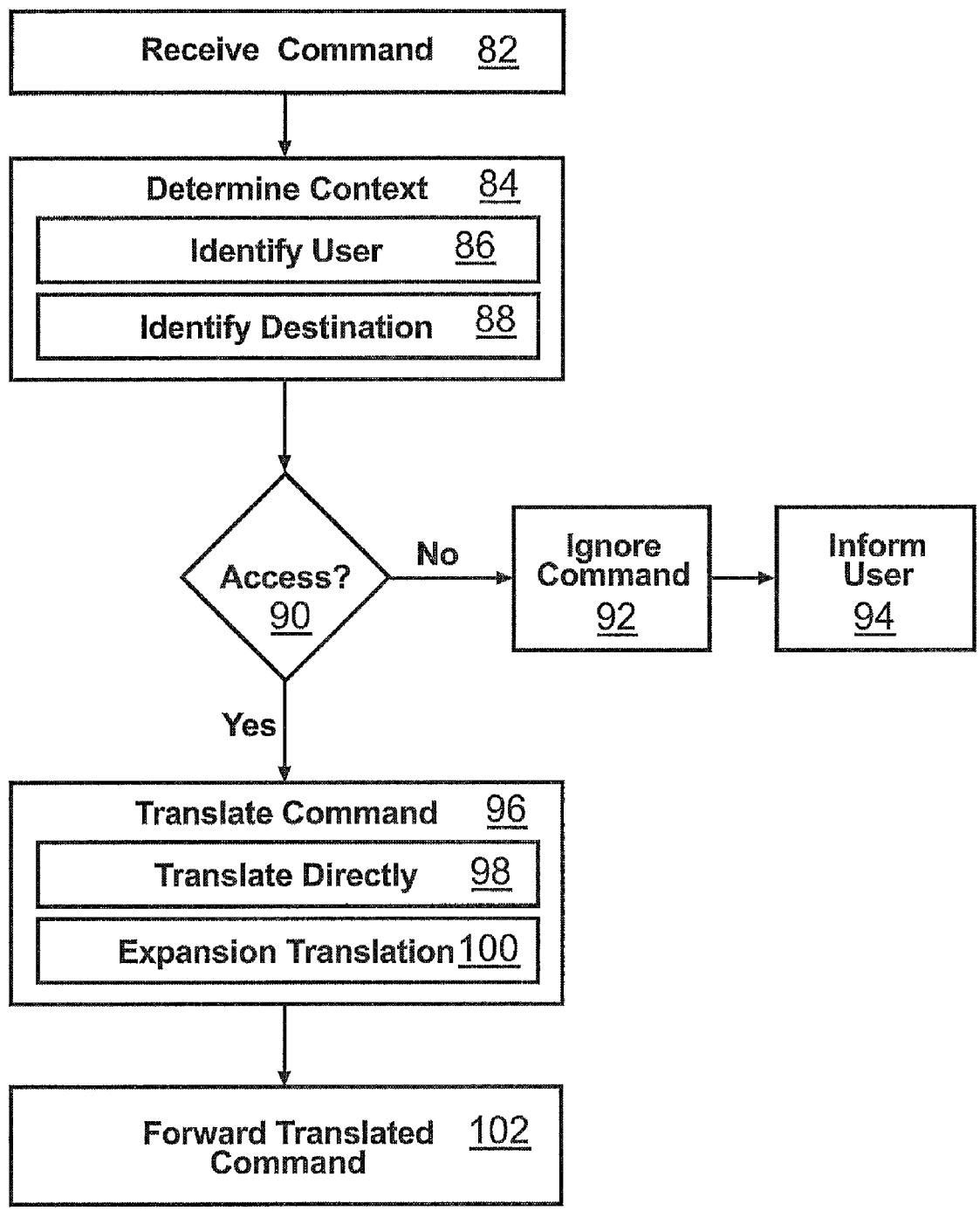
FIG. 8 is a schematic block diagram of one embodiment of a method for operating a command processor in accordance with the present invention.

Referring to FIG. 8, in operation, a command processor 40 in accordance with the present invention may receive 82 a command 32, 34, 36 and determine 84 the context thereof. By determining 84 the context of the command 32, 34, 36 the command processor 40 may determine what should be done with the command 32, 34, 36. In selected embodiments, determining 84 the context of the command 32, 34, 36 may include identifying 86 the user who issued the command 32, 34, 36, which may be done by referring to the username under which the user is logged in. Determining 84 the context of the command 32, 34, 36 may also include identifying 88 the intended destination of the command 32, 34, 36.

With the user and destination known, a command processor 40 may determine 90 whether the user has access, that is, whether the user has previously been given permission to send such a command 32, 34, 36 to such a destination. If the user does not have access, the command 32, 34, 36 may be ignored 92 and the user may be informed 94 that the command will not be executed due to a lack of proper access. If the user does have access, the command 32, 34, 36 may, if needed, be translated 96.

A command 32, 34, 36 may be translated 96 in accordance with the present invention in a variety of ways. In selected situations, a command 32, 34, 36 may be translated directly 98. For example, a command 32, 34, 36 to restart in one form or language may be translated into a command 20, 22, 24 to restart in a different form or language that may be understood by the destination subsystem 12. Direct translation 98 may be analogized to translating "hello" in English to "hola" in Spanish.

In other situations, a command 32, 34, 36 may be translated 96 through expansion 100. In such situations, the command 32, 34, 36 may, in effect, comprise a virtual, shorthand notation for a particular list of actual commands 20, 22, 24. For example, within a command processor 40, a list of commands 20, 22, 24 may be assigned to a specific function key. The list of commands 20, 22, 24 may include commands to more than one destination. For example, one command 20, 22, 24 on the list may be directed to a first subsystem 12*a* while another command 20, 22, 24 on the list may be directed to a second subsystem 12*b*. Accordingly, when the specific function key is pressed, the various commands 20, 22, 24 contained in the list may be identified. Expansion translation 100 may be analogized to translating "tasks identified in storage location one" to "subsystem one perform tasks one and two, subsystem two perform task five," or the like.

Once translation 96 is complete, the resulting commands 20, 22, 24 may be forwarded 102 to the appropriate destination or destinations. Appropriate destinations may include subsystems 12, selected components or modules within the same integrator 14, selected components or modules within a neighboring integrator 14, or the like. In situations where an expansion translation 100 has resulted in a list of commands directed to various destinations, the commands 20, 22, 24 may be forwarded to the various destinations substantially simultaneously.

Figure 9:
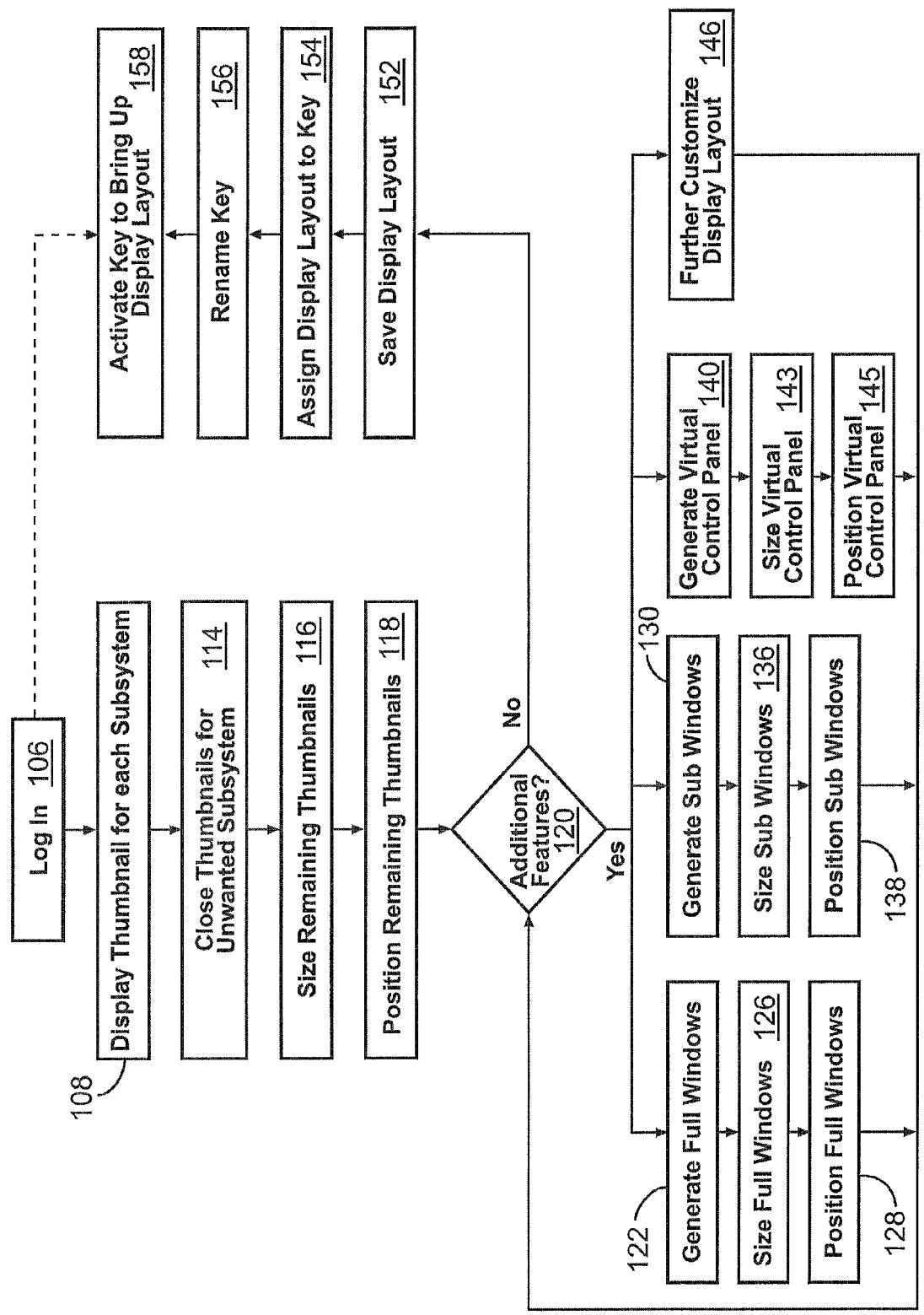
FIG. 9 is a schematic block diagram of one embodiment of a method for creating display layouts in accordance with the present invention.
Figure 10:
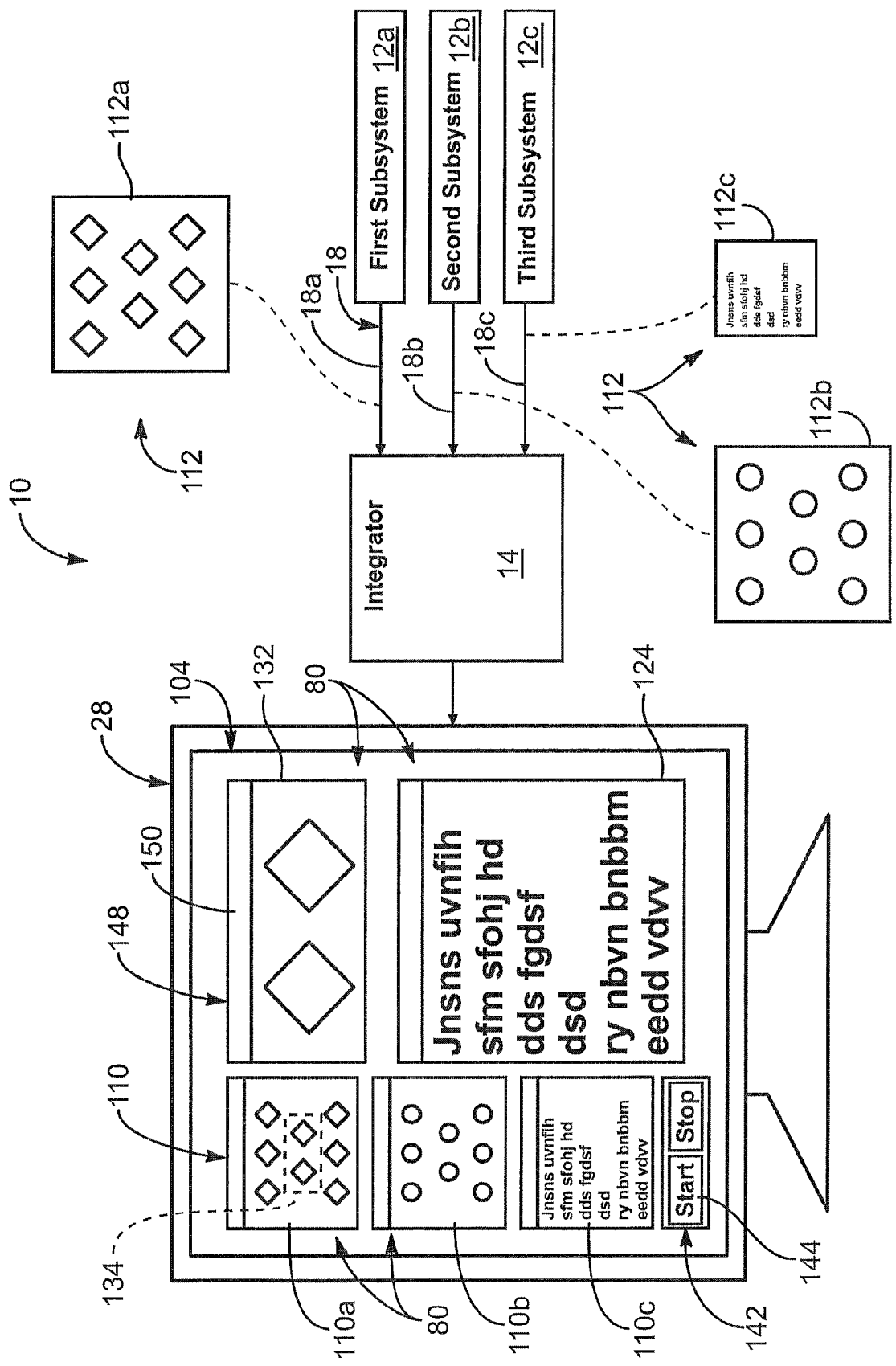
FIG. 10 is a schematic block diagram of an embodiment of a display layout in accordance with the present invention.

Referring to FIGS. 9 and 10, to create a display layout 104, a user may first log in 106 at the workstation 16 of a system 10 in accordance with the present invention. In selected embodiments, at a new user start up, a default setting may display 108 a thumbnail window 110*a*, 110*b*, 110*c* for each of the connected subsystems 12*a*, 12*b*, 12*c*. Alternatively, a selected command 32, 34, 36 may trigger a default setting to display 108 a "thumbnail" or subsized 110*a*, 110*b*, 110*c* for each of the connected subsystems 12*a*, 12*b*, 12*c*.

In selected embodiments, a thumbnail 110 may be a complete view of the image 112 defined by a display signal 18. The thumbnail 110 may comprise a real time image 112 of the display signal 18 output by a particular subsystem 12. In generating a thumbnail 110, the image 112 may be reduced in resolution. Accordingly, several thumbnails 110 may fit within a display layout 104.

By reviewing a thumbnail 110*a*, 110*b*, 110*c* of each connected subsystem 12*a*, 12*b*, 12*c*, a user may identify the subsystems 12 desired to be included within the display layout 104. Accordingly, the user may close 114 the thumbnails 110 corresponding to unwanted subsystems 12. In selected situations, an administrator may require selected subsystems 12 to be displayed in at least thumbnail 110 form at all times. In such situations, access limitations may prevent a user from closing 114 thumbnails 110 corresponding to the selected subsystems 12. Thumbnails 110 that are not closed may be sized 116 and positioned 118 according to the preferences of the user.

In selected embodiments in accordance with the present invention, a user may choose 120 to include additional features within a display layout 104. For example, a user may choose 120 to generate 122 one or more full windows 124. In certain embodiments, a full window may be a complete, full-resolution, real-time image 112 defined by the display signal 18 of a selected subsystem 12. Full resolution may reduce the likelihood that artifacts produced by sub-sampling will conceal information, distort grids, or the like. Once generated 122, a full window 124 may be sized 126 and positioned 128 according to the desires or preferences of the user. In some embodiments, sizing of a full window 124 may be limited to "up-converting" to ensure that possibly significant details are not lost. In other embodiments, sizing 126 of a full window 124 may be prohibited and the full window 124 may simply represent the full resolution image 112 defined by the display signal 18.

If desired, a user may choose 120 to generate 130 one or more subwindows 132. In certain embodiments, a subwindow 132 may provide a method to highlight and emphasize information that may be critical to the user. For example, in many situations, only a portion of the information displayed in an image 112 is needed by a user. Subwindows 132 may give a user the ability to select and magnify a selected area 134 of the image 112 defined by the display signal 18 of a selected subsystem 12. In selected embodiments, by adjusting the coverage of the selected area 134, the portion of the image 112 displayed within a subwindow 132 may be adjusted.

Once generated 130, a subwindow 132 may be sized 136 and positioned 138 according to the desires or preferences of the user. By sizing 136 a subwindow 132, the effective magnification of the selected area 134 may be controlled. The portion of the image 112 displayed within a subwindow 132 may be updated in real time.

In selected embodiments, a user may choose 120 to generate 140 (e.g. create and display) one or more virtual control panels 142 or graphical control elements 142. In some embodiments, a virtual control panel 142 may comprise a bitmap image of one or more buttons 144, switches 144, knobs 144, or the like that may be activated by the system cursor (e.g. pointer 30*b*), a "hot" or special function key, or some other command 32, 34, 36 or data input. If desired, activation of a button 144, etc. on a virtual control panel 142 may issue one or more commands 32, 34, 36 directed to the operation of a corresponding integrator 14, subsystem 12, or the like.

In certain embodiments, incoming data (e.g. display signal 18) may be used by an integrator 14 to determine whether to activate or change a graphical representation of a lamp, LED, alpha-numeric display, or the like within a virtual control panel 142. In one embodiment, access limitations may ensure that a virtual control panel 142 is always on the top layer and not obscured by any windows 80 or the like. Once generated 140, a virtual control panel 142 may be sized 143 and positioned 145 according to the desires or preferences of the user.

If desired, a user may choose 120 to further customize 146 a display layout 104. In general, any customization that assists a user in differentiating between, or more logically organizing, various windows 80, virtual control panels 142, or the like may be supported within a system 10 in accordance with the present invention. For example, a user may select a particular color for the border 148 of a window 80 or virtual control panel 142. A user may also enter a customized name in the title bar 150 portion of the border 148. A user may further select a default layering scheme for any windows 80, virtual control panels 142, or the like that overlap.

Once a user has created a display layout 104 that reflects preferences, needs, etc. to the extent permitted under application access restrictions, the user may save 152 the display layout 104 so that it may be rapidly regenerated at a future time. If desired, a saved display layout 104 may be assigned 154 to a particular key. Such a key may be an actual or virtual button, switch, knob, or the like that may be selected or activated by a user with commands 32, 34, 36 entered into an input device 30. In certain embodiments, a key may be renamed 156 to reflect the nature of the display layout assigned 154 thereto. For example, a virtual key on a display 28 may be renamed 156 to "Heating Systems" to indicate that the assigned display layout 104 is a convenient and logical arrangement of the subsystems 12 that control heating.

When activated 158, a key corresponding to a display layout 104 may issue the necessary commands to bring that display layout 104 to the display 28. If desired, a user may create several display layouts 104 to meet needs, facilitate work, and accommodate preferences. In selected embodiments, display layouts 104 may be designed and arranged to permit a user to efficiently perform selected monitoring, tasks, or the like. For example, all the feedback and commands needed to effectively control heating may be contained within a "Heating Systems" display layout 104, while all the feedback and commands needed to effectively control ingredient allocation may be contained with an "Allocation Systems" display layout 104.

Having created display layouts 104 that meet one's own needs, facilitate work, and accommodate preferences, a user need not "reinvent the wheel" every time he or she logs in 106 to a system 10 in accordance with the present invention. Once logged in 106, a user may simply activate 158 a key corresponding to the display layout 104 to view. In selected embodiments, display layouts 104 and associated keys may be stored according to username within a system 10 in accordance with the present invention. Thus, when one user is logged on 106 to a workstation 16, he or she may access his or her own display layouts 104. When another user is logged on 106 to the same workstation 16, she may access her own display layouts 104. If desired, integrators 14 interconnected in accordance with the present invention may be configured to share display layouts 104. Accordingly, a user may access his or her display layouts 104 from any one of various workstations 16.

In selected embodiments, an integrator 14 in accordance with the present invention may record current state information for every window 80. State information may include position, size, coverage, whether active or closed, or the like. Accordingly, if an integrator 14 is ever unintentionally powered down, the integrator 14 may return, when power is returned, to the last known state. This may include automatically logging in 106 the last user as well displaying each window 80 in its last known state. Additionally, in certain embodiments, when a window 80 is closed, an integrator 14 may record the last state of that window. Accordingly, if that window 80 is ever relaunched, it may be presented in its last known state.

Figure 11:
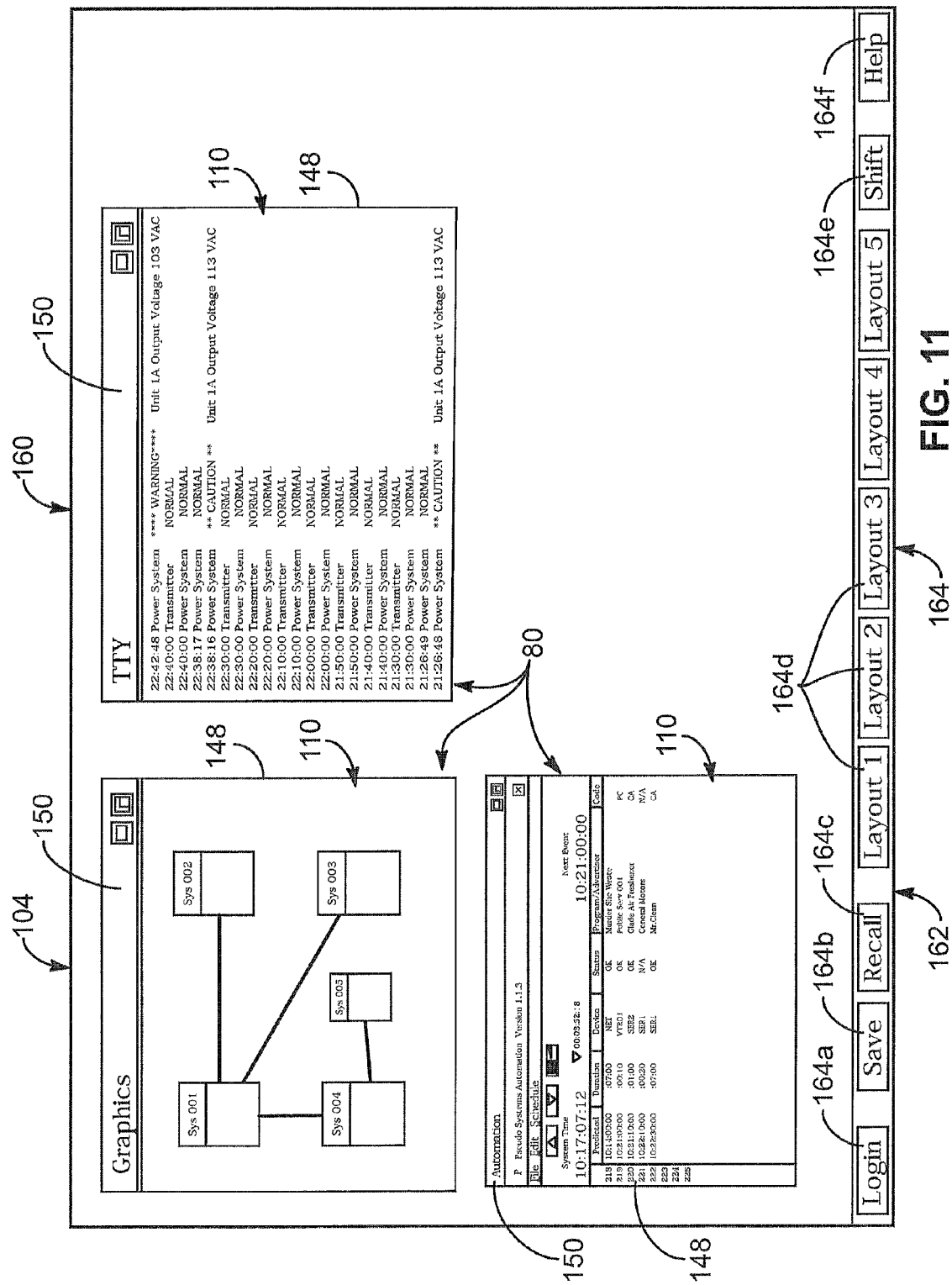
FIG. 11 is a schematic illustration of a screen shot showing one embodiment of a display layout produced in accordance with the present invention to include a tool bar and various "thumbnail" windows.

Referring to FIG. 11, in selected embodiments, at startup, the image 160 defined by a composite display signal 26 may include a thumbnail 110 for each connected subsystem 12 and one or more toolbars 162 presenting an array of macros 164 or virtual buttons 164. The title bar 150 of each thumbnail 110 may be "grayed" indicating no thumbnail 110 is activated or has the focus of control. However, each thumbnail 110 may continue to present real time images 112 from the corresponding subsystems 12.

A tool bar 162 in accordance with the present invention may have any macros 164 desired or necessary to facilitate operation of the system 10. In one embodiment, a tool bar 162 may include log in 164a, save 164b, recall 164c, layout 164d, shift 164e, and help 164f macros.

A log in macro 164a may allow a user to be identified by the system 10. In selected embodiments, when a user logs in 106, the display layout 104 may continue with the current layout 104 or change to the layout 104 last employed by the user. In some embodiments, the macros 164 displayed on a tool bar 162 may vary according to the preferences of each user. Accordingly, when a user logs in 106, the tool bar 162 may change to an arrangement last employed or defined by the user.

A save macro 164b may immediately save 152 the current display layout 104. In selected embodiments, the layout buttons 164d or macros 164d may "gray" for a selected period of time. During this period of time, any of the layout macros 164d may be assigned 154 (or reassigned) to store the newly saved 152 display layout 104. If desired, the period of time wherein a layout macro 164d may be assigned 154 a new display layout 104 may be controlled as a setup option.

A recall macro 164c may recall the last display layout 104 saved by the particular user. The last display layout 104 may be recalled even if that layout 104 was also assigned to a specific layout macro 164d. In selected embodiments, as a setup option, a recall macro 164c may be set as a single register, a stack, or a circular buffer with a selected depth (e.g. up to 16 saves).

In selected embodiments, one or more layout macros 164d may be included as part of a tool bar 162. Activating 158 a layout macro 164d may bring to the display 28 the last display layout 104 that was assigned 154 to that layout macro 164d. In some embodiments, the name applied to a layout macro 164d may be customized by a user.

A shift macro 164e may be configured to control which layout macros 164d are displayed on the tool bar 162. For example, in one embodiment, a tool bar 162 may only display five layout macros 164d of a total of ten. Accordingly, by selecting the shift macro 164e, a user may toggle between layout macros 164d one through five and layout macros 164d six through ten. In embodiments employing more than two sets of layout macros 164d, a shift macro 164e may cycle rather than toggle. If desired, the shift macro 164e may be visible only if there are multiple sets of layout macros 164d to display. In selected embodiments, the number of sets and the number of layout macros 164d within a set may be controlled as a setup option.

Activation of a help macro 164f may invoke a help system. In selected embodiments, a help system may be stored locally. In other embodiments, a help system may be stored remotely. For example, in one embodiment, activation of the help macro 164f launches an Internet browser addressed to a website containing the help system.

In selected embodiments, macros 164 other than those illustrated in FIG. 11 may be included. For example, some embodiments in accordance with the present invention may include a setup macro 164. Activation of a setup macro 164 may permit a user to enter a system setup mode. The available setup options may depend upon access limitations put in place by an administrator. However, in one embodiment, various options to further customize 146 a display layout 104 may be presented.

Figure 12:
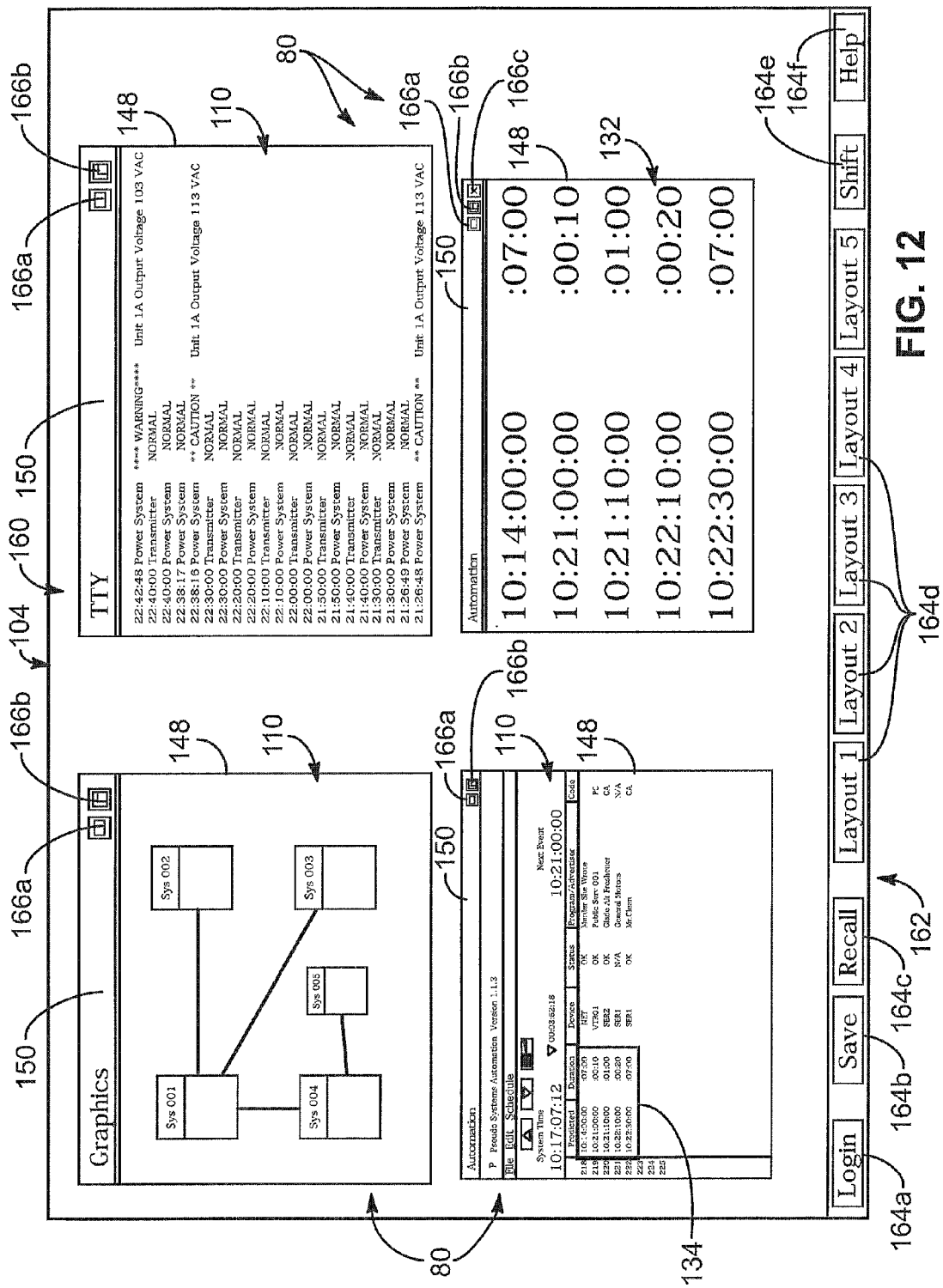
FIG. 12 is a schematic illustration of a screen shot showing an alternative embodiment of a display layout produced in accordance with the present invention to include a tool bar, various thumbnail windows, and a subwindow corresponding to one of the thumbnail windows.

Referring to FIG. 12, in certain embodiments, when a window 80 is activated or selected for the focus of control, the title bar 150 may be highlighted, colored, or otherwise changed from an inactive "gray." For example, in the illustrated embodiment, the "Automation" subsystem 12 has been selected for the focus of control. Accordingly, the windows 80 (e.g. thumbnail window 110 and subwindow 132) corresponding to the "Automation" subsystem 12 have title bars 150 that are colored.

The title bar 150 of a window 80 in accordance with the present invention may include one or more macros 166 or virtual buttons 166. Suitable buttons 166 may include subwindow buttons 166a, sizing buttons 166b, closing buttons 166c, or the like.

In certain embodiments, selecting a subwindow button 166a on a thumbnail 110 may allow a user to create (i.e. define the coverage of) a subwindow 132. If, at some point, a subwindow 132 for that subsystem 12 had been created, selecting a subwindow button 166a may recall the last defined subwindow 132. That is, the new subwindow 132 may have the same size, coverage, and position as the previous subwindow 132. Selecting a subwindow button 166a on a subwindow 132 may enable a user to adjust the coverage of the selected area 134, and consequently, the coverage of the subwindow 132.

In selected embodiments, as a setup option, a sub-window button 166a on a thumbnail 110 or full window 124 may either toggle the border delineating the selected area 134 between "on" and "off" or permit modification of the coverage of the subwindow 132. If the border illustrating the selected area 134 is off and the operator activates the subwindow button 166a on the sub-window 132, the border may appear and its position or extent may be manipulated to change the coverage of the selected area 134, and consequently, the coverage of the subwindow 132.

In certain embodiments, a sizing button 166b, when selected, may allow a user to determine the size (e.g. in pixels)

that the corresponding window 80 will occupy within the image 160 present on the display 28. Changing the size of a window 80 need not change the percentage of the image 112 generated by the subsystem 12 that is shown. In selected embodiments, only thumbnails 110 and subwindows 132 may be sized.

When activated or selected, a close button 166c in accordance with the present invention may "close" the corresponding window 80. That is, the window 80 may be removed from the image 160 produced on the display 28. In selected embodiments, only full windows 124 and subwindows 132 may have close buttons 166c. In such embodiments, thumbnails 110 may not be "closed." Accordingly, a thumbnail 110 for each connected subsystem 12 may be included as a navigation, monitoring, or selection aid in every display layout 104.

Figure 13:
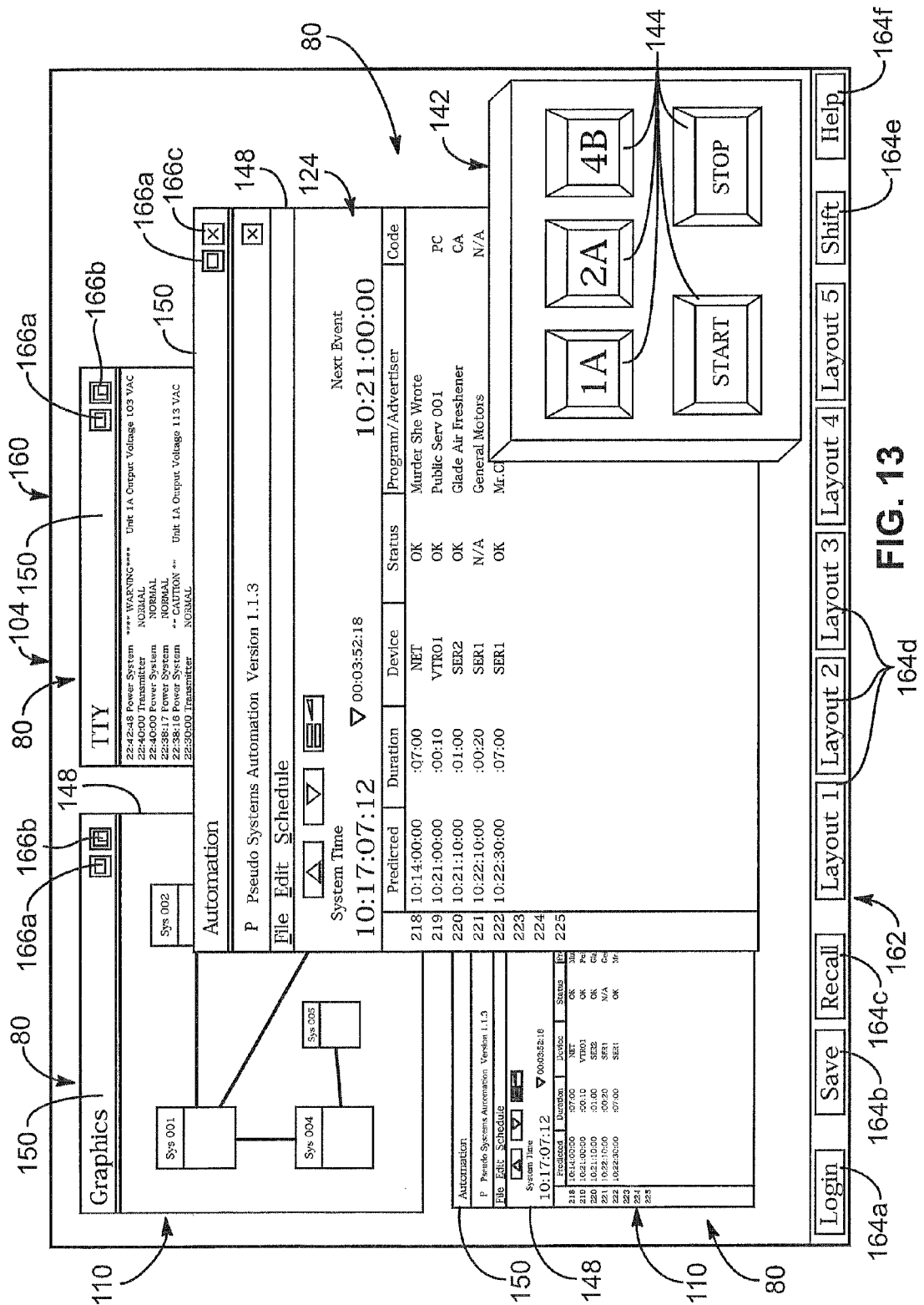
FIG. 13 is a schematic illustration of a screen shot showing another alternative embodiment of a display layout produced in accordance with the present invention to include a tool bar, various thumbnail windows, a full window corresponding to one of the thumbnail windows, and a virtual control panel.

Referring to FIG. 13, a full window 124 in accordance with the present invention may be generated or launched in any suitable manner. For example, in one embodiment, a full window 124 may be launched by double clicking over the thumbnail 110 of the subsystem 12 for which the user desires a full window 124. When a user is done with a full window 124, it may be "closed" by selecting an appropriate close button 166c. In selected embodiments, if a full window 124 is subsequently relaunched, it may take the size and positioning of the most recent full window 124 for that subsystem 12.

A virtual control panel 142 may take any shape, configuration, or complexity desired by a user. Selection or activation of a button 144 on a virtual control panel 142 may cause one or more commands to be issued to one or more destinations. In some embodiments, status information from a controlled system may be communicated through changes in the appearance of the virtual control panel 142. For example, if a particular sensor of a selected subsystems 12 registers a reading above or below at critical value, one or more "lights", markers, or colors may be activated to uniquely illuminate the virtual control panel 142 and draw attention onto its status.

In selected embodiments, an integrator 14 in accordance with the present invention may host software to assist a user in graphically designing and generating a virtual control panel 142. Additionally, such software may also permit a user to articulate the various commands 32, 34, 36 to be issued upon selection, activation, adjustment, or the like of a button 144, switch 144, knob 144, dial, graduated control, etc. of the virtual control panel 142.

The present invention may be embodied in other specific forms without departing from its basic functionality or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method for sharing control of subsystems, the method comprising:
    identifying an integration system comprising a first display processor and a first command processor;
    receiving, by the first display processor, a plurality of display signals comprising a display signal from each subsystem of a plurality of subsystems, the plurality of display signals further comprising two display signals physically disparate in form sufficient to be incompatible with one another;
    translating, by the first display processor, the two display signals that are incompatible with one another into a common form and integrating the translated display signals into first and second composite display signals that are passed from the first display processor to respective displays of a first and second workstation;
    storing, by the integration system, a first display layout personalized by a first operator interacting with the integration system via the first workstation;
    storing, by the integration system, a second display layout personalized by a second operator interacting with the integration system via the second workstation;
    monitoring, simultaneously by the first and second operators via the first and second workstations, respectively, functionality of the plurality of subsystems
    receiving, by the integration system via the first workstation, a first command input by the first operator into the first workstation;
    receiving, by the integration system via the second workstation, a second command input by the second operator into the second workstation;
    translating, by the first command processor, one or both of the first and second commands into a form compatible with a first subsystem whenever the one or both of the first and second commands, as originally generated, is incompatible with the first subsystem; and
    routing, by the first command processor, the translated first and second commands to the first subsystem of the plurality of subsystems.

2. The method of claim 1, further comprising executing by the first subsystem the first and second commands.

3. The method of claim 2, further comprising updating, by the integration system, data displayed within the first and second display layouts in accordance with changes to the first subsystem implemented in response to the first command.

4. The method of claim 3, further comprising updating, by the integration system, data displayed within the first and second display layouts in accordance with changes to the first subsystem implemented in response to the second command.

5. The method of claim 4, wherein the integration system comprises a first integrator and a second integrator, the first integrator comprising the first display processor and the first command processor.

6. The method of claim 5, wherein the second integrator comprises a second display processor and a second command processor.

7. The method of claim 6, wherein routing further comprises passing the second command from the second workstation to the second integrator, from the second integrator to the first integrator, and from the first integrator to the first subsystem.

8. The method of claim 7, wherein the first and second display layouts comprise a first and a second plurality of windows, respectively.

9. The method of claim 8, wherein each signal of the plurality of display signals corresponds to at least one window of the first plurality of windows and at least one window of the second plurality of windows.

10. The method of claim 9, further comprising personalizing, by the first operator, the first display layout by inputting first layout commands into the first workstation, the first layout commands controlling the sizing and positioning of a window of the first plurality of windows.

11. The method of claim 10, wherein at least one display signal of the plurality of display signals corresponds to an image.

12. The method of claim 11, wherein the first layout commands control the portion of the image displayed within a window of the first plurality of windows.

13. The method of claim 12, wherein each display of the a plurality of display signals is of a form selected from the group consisting of digital component image signal, analog component image signal, digital composite image signal, analog composite image signal, digital compressed image signal, a voltage, a current, a contact condition, an encoded digital signal, and a value corresponding to a state of a component.

14. The method of claim 1, wherein:
the first and second display layouts comprise a first and a second plurality of windows, respectively; and
each signal of the plurality of display signals corresponds to at least one window of the first plurality of windows and at least one window of the second plurality of windows.

15. The method of claim 14, further comprising personalizing, by the first operator, the first display layout by inputting first layout commands into the first workstation, the first layout commands controlling the sizing and positioning of a window of the first plurality of windows.

16. The method of claim 15, wherein:
at least one display signal of the plurality of display signals corresponds to an image; and
the first layout commands control the portion of the image displayed within a window of the first plurality of windows.

17. The method of claim 1, wherein each display of the plurality of display signals is of a form selected from the group consisting of digital component image signal, analog component image signal, digital composite image signal, analog composite image signal, digital compressed image signal, a voltage, a current, a contact condition, an encoded digital signal, and a value corresponding to a state of a component.

18. The method of claim 1, wherein:
the integration system comprises a first integrator and a second integrator;
the first integrator comprising the first display processor and the first command processor;
the second integrator comprises a second display processor and a second command processor; and
routing further comprises passing the second command from the second workstation to the second integrator, from the second integrator to the first integrator, and from the first integrator to the first subsystem.

19. A method for sharing control of subsystems, the method comprising:
identifying an integration system comprising a display processor and a command processor;
receiving, by the display processor, a plurality of display signals comprising a display signal from each subsystem of a plurality of subsystems, the plurality of display signals further comprising two display signals physically disparate in form sufficient to be incompatible with one another;
translating, by the display processor, the two display signals that are incompatible with one another into a common form and integrating the translated display signals into first and second composite display signals that are passed from the display processor to respective displays of a first and second workstation;
personalizing, by a first operator, a first display layout by inputting first layout commands into the first workstation, the first layout commands controlling the size and position of at least one window of a first plurality of windows, each window of the first plurality of windows corresponding to a signal of the plurality of display signals;
personalizing, by a second operator, a second display layout by inputting second layout commands into the second workstation, the second layout commands controlling the size and position of at least one window of a second plurality of windows, each window of the second plurality of windows corresponding to a signal of the plurality of display signals;
storing, by the integration system, the first display layout;
storing, by the integration system, the second display layout;
receiving, by the integration system via the first workstation, a first command input by the first operator into the first workstation;
receiving, by the integration system via the second workstation, a second command input by the second operator into the first workstation;
translating, by the command processor, one or both of the first and second commands into a form compatible with a first subsystem whenever the one or both of the first and second commands, as originally generated, is incompatible with the first subsystem; and
routing, by the command processor, the translated first and second commands to the first subsystem of the plurality of subsystems.

20. A method for sharing control of subsystems, the method comprising:
identifying an integration system comprising a display processor and a command processor;
receiving, by the display processor, a plurality of display signals comprising a display signal from each subsystem of a plurality of subsystems, the plurality of display signals further comprising two display signals physically disparate in form sufficient to be incompatible with one another;
translating, by the display processor, the two display signals that are incompatible with one another into a common form and integrating the translated display signals into first and second composite display signals that are passed from the display processor to respective displays of a first and second workstation;
storing, by the integration system, a first display layout personalized by a first operator via the first workstation;
storing, by the integration system, a second display layout personalized by a second operating via the second workstation;
receiving, by the integration system via the first workstation, a first command input by the first operator;
receiving, by the integration system via the second workstation, a second command input by the second operator;
translating, by the command processor, one or both of the first and second commands into a form compatible with a first subsystem whenever the one or both of the first and second commands, as originally generated, is incompatible with the first subsystem; and
routing, by the command processor, the translated first and second commands to the first subsystem of the plurality of subsystems;
executing by the first subsystem the routed first and second commands; and
updating, by the integration system, data displayed within the first and second display layouts in accordance with changes to the first subsystem implemented in response to the routed first and second commands.

* * * * *